(12) United States Patent
Kim et al.

(10) Patent No.: US 10,893,574 B2
(45) Date of Patent: Jan. 12, 2021

(54) PACKET DATA UNIT SESSION RELEASE METHOD AND NETWORK ENTITY PERFORMING THE SAME

(71) Applicant: ELECTRONICS AND TELECOMMUNICATIONS RESEARCH INSTITUTE, Daejeon (KR)

(72) Inventors: Changki Kim, Daejeon (KR); Jeoung Lak Ha, Daejeon (KR); Yoo Hwa Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 15 days.

(21) Appl. No.: 16/380,748

(22) Filed: Apr. 10, 2019

(65) Prior Publication Data
US 2019/0313477 A1 Oct. 10, 2019

(30) Foreign Application Priority Data

Apr. 10, 2018 (KR) .......... 10-2018-0041801
Mar. 15, 2019 (KR) .......... 10-2019-0030009

(51) Int. Cl.
*H04W 76/34* (2018.01)
(52) U.S. Cl.
CPC .................. *H04W 76/34* (2018.02)
(58) Field of Classification Search
CPC ..... H04W 76/34; H04W 76/30; H04W 76/10; H04W 76/20; H04W 8/08; H04W 36/0011; H04W 36/14; H04W 36/0022; H04W 60/00; H04W 60/06
See application file for complete search history.

(56) References Cited

U.S. PATENT DOCUMENTS

| 2016/0149871 | A1  | 5/2016 | Heo et al. |
| 2016/0218979 | A1  | 7/2016 | Roh |
| 2018/0376445 | A1* | 12/2018 | Yoon ........................ H04W 8/20 |

OTHER PUBLICATIONS

3GPP TS 23.502 V15.1.0 (Mar. 2018), 3rd Generation Partnership Project; Technical Specification Group Services and System Aspects; Procedures for the 5G System; Stage 2, (Release 15), pp. 1-285.
ETRI, "Updating 6.2 Solution 2 to add a procedure for Multi-Access PDU Session Release", SA WG2 Meeting #127 S2-183689, Apr. 16-20, 2018, pp. 1-3.
ITRI, ETRI, "MA-PDU session release operations", SA WG2 Meeting #127, S2-184119, Apr. 16 to Apr. 20, 2018, pp. 1-3.

* cited by examiner

*Primary Examiner* — Kent Krueger
(74) *Attorney, Agent, or Firm* — Rabin & Berdo, P.C.

(57) ABSTRACT

A packet data unit (PDU) session release method and a network entity performing the same are disclosed.
An access and mobility management function (AMF) may receive a PDU session release request message including an access type which is an access network to be released in a multi-access PDU (MA PDU) session from user equipment (UE) when the MA PDU session is established. The AMF transmits a first message including the access type to a session management function (SMF).

10 Claims, 4 Drawing Sheets

PACKET DATA UNIT SESSION RELEASE METHOD AND NETWORK ENTITY PERFORMING THE SAME

CROSS-REFERENCE TO RELATED APPLICATION

This application claims priority to and the benefit of Korean Patent Application Nos. 10-2018-0041801 and 10-2019-0030009 filed in the Korean Intellectual Property Office on Apr. 10, 2018 and Mar. 15, 2019, respectively, the entire contents of which are incorporated herein by reference.

BACKGROUND OF THE INVENTION

(a) Field of the Invention

The present invention relates to packet data unit session release method and a network entity performing the same.

(b) Description of the Related Art

Recently, standardization of 5G network technology has been underway. In this 5G network, the standardization work is underway to support access traffic steering, switching, and splitting (ATSSS) between a 3GPP access network and a non-3GPP access network.

Traffic steering is the procedure that selects an access network for a new data flow and transfers the traffic of this data flow over the selected access network. Traffic switching is the procedure that moves all traffic of an ongoing data flow from one access network to another access network in a way that maintains the continuity of the data flow. Traffic splitting is the procedure that splits the traffic of a data flow across multiple access networks. When traffic splitting is applied to a data flow, some traffic of the data flow is transferred via one access and some other traffic of the same data flow is transferred via another access.

In order to provide traffic (data, voice, etc.) to user equipment (UE) in a 5G network, packet data unit (PDU) session establishment is required between the UE and a data network. When the service is completed, the corresponding PDU session is released.

Existing PDU session establishment is performed only through the UE and one access network (3GPP access network or non-3GPP access network), thereby establishing a single access PDU (SA PDU) session. A plurality of SA PDU sessions may be established in one UE, and the plurality of SA PDU sessions may be distinguished through PDU session identifiers, respectively. If service provision to the UE is terminated or a user traffic session needs to be changed, the established PDU session may be modified or released by triggering of the UE or the network.

However, since an existing single access PDU (SA PDU) session is established to only one access network, user traffic belonging to the corresponding PDU session may not be transmitted/received through two or more access networks. Accordingly, it is difficult to provide a service supporting the ATSSS function. To support the ATSSS function, one PDU session with unique identifier established over two or more accesses is required. This PDU session is called a multi-access PDU (MA PDU) session.

SUMMARY OF THE INVENTION

The present invention provides a method for releasing an MA PDU session established for an ATSSS function and a network entity performing the same.

The present invention provides a method for converting an MA PDU session established for an ATSSS function into an SA PDU session and a network entity performing the same.

According to an exemplary embodiment of the present invention, a method for releasing a packet data unit (PDU) session in a network is provided. The method includes receiving, by an access and mobility management function (AMF), a PDU session release request message including an access type which is an access network to be released in a multi-access PDU session (MA PDU session) from user equipment (UE) when the MA PDU session is established, and transmitting, by the AMF, a first message including the access type to a session management function (SMF)

The method may further include triggering, by the SMF, a PDU session release when the SMF receives the first message, and transmitting, by the SMF, a session modification request message including the access type to a user plane function (UPF).

The access type may be a 3GPP access network, a non-3GPP access network, or both the 3GPP access network and the non-3GPP access network.

The access type may be either a first access network or a second access network, and the PDU session release request message may be received through the first access network.

The method may further include receiving, by the AMF, a second message from the SMF in response to the first message, and the second message may include a PDU session release command message and the access type.

The method may further include transmitting, by the AMF, a third message requesting a resource release to the first access network, and transmitting, by the first access network, the PDU session release command message to the UE.

The method may further include receiving, by the AMF, an Ack (acknowledgement) message for the third message from the first access network, and transmitting, by the AMF, a fourth message including the access type to the SMF.

The method may further include receiving, by the AMF, a PDU session release Ack (acknowledgement) message from the UE, transmitting, by the AMF, a fourth message including the access type to the SMF, and receiving, by the AMF, from the SMF, that a PDU session corresponding to the access type has been released.

The access type may be both a first access network and a second access network, and the PDU session release request message may be received through the first access network.

The method may further include receiving, by the AMF, a second message from the SMF in response to the first message and receiving, by the AMF, a third message from the SMF, and the second message may include a PDU session release command message, and the access type, and the third message may include the access type.

The method may further include transmitting, by the AMF, a fourth message requesting a resource release to the second access network, receiving, by the AMF, an Ack (acknowledgement) message for the fourth message from the second access network, and transmitting, by the AMF, a fifth message including the access type to the SMF.

The method may further include transmitting, by the AMF, a fourth message requesting a resource release to the first access network, transmitting, by the first access network, the PDU session release command message to UE, receiving, by the AMF, an Ack message for the fourth message from the first access network, and transmitting, by the AMF, a fifth message including the access type to the SMF.

The method may further include receiving, by the AMF, a PDU session release Ack (acknowledgement) message from the UE, transmitting, by the AMF, a sixth message including the access type to the SMF, and receiving, by the AMF, from the SMF, that a PDU session corresponding to the access type has been released.

The first message may be an Nsmf_PDUSession_UpdateSMContext message.

The first access network and the second access network may be either a 3GPP access network or a non-3GPP access network, respectively.

According to another exemplary embodiment of the present invention, a method for releasing a packet data unit (PDU) session in a network is provided. The method includes receiving, by a session management function (SMF), a PDU session release request including an access type which is an access network to be released in a multi-access PDU session (MA PDU session) when the MA PDU session is established, and performing, by the SMF, a PDU session release in response to the PDU session release request.

The access type may be a first access network, a second access network, or both the first access network and the second access network.

The method may further include transmitting, by the SMF, an Nsmf_PDUSession_UpdateSMContext response message to an access and mobility management function (AMF) and the Nsmf_PDUSession_UpdateSMContext response message may include a PDU session release command message and the access type.

The method may further include transmitting, by the SMF, a Namf_Communication_N1N2MessageTransfer message including the access type to the AMF.

According to another exemplary embodiment of the present invention, a network entity that controls release for a packet data unit (PDU) session in a network is provided. The network entity may a processor controlling to release a multi-access PDU (MA PDU) session when the MA PDU session is established in user equipment and a network interface receiving a PDU session release request that includes an access type which is an access network to be released in the MA PDU session, and the processor may control to release resource of access network corresponding to the access type of the MA PDU session.

According to the exemplary embodiment of the present invention, release and conversion to SA PDU Session for the MA PDU session generated for ATSSS function support can easily be provided.

DETAILED DESCRIPTION OF THE EMBODIMENTS

Figure 1:
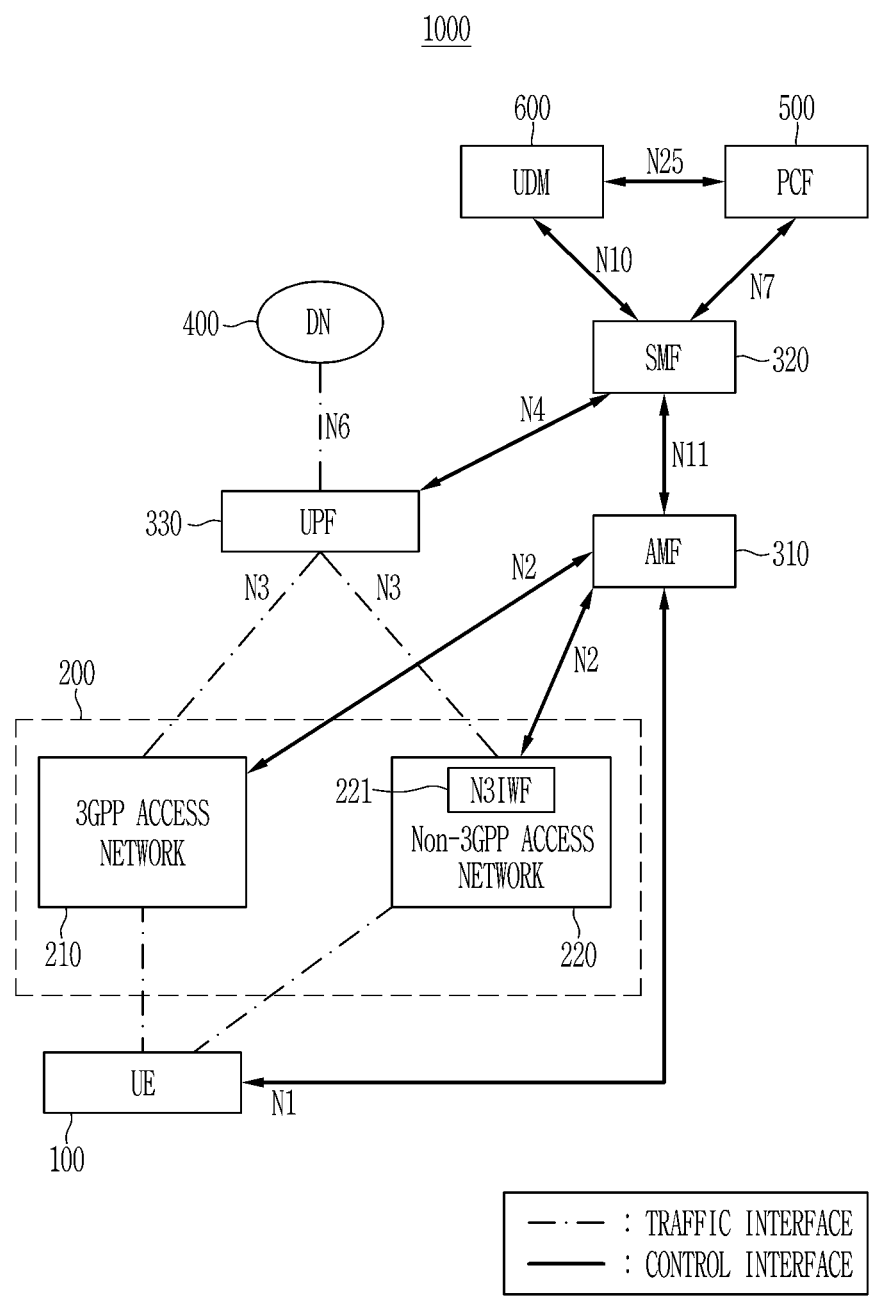
FIG. 1 is a diagram showing a 5G network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. Throughout the present specification, user equipment (UE) may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), or the like, and may include all or some of the functions of the terminal, the MT, the AMS, the HR-MS, the SS, the PSS, the AT, or the like. In addition, a base station (BS) may indicate an advanced base station (ABS), a high reliability base station (HR-BS), a nodeB, an evolved nodeB (eNodeB), a base transceiver station (BTS), a mobile multihop relay (MMR)-BS, a relay station (RS) serving as a base station, a high reliability relay station (HR-RS) serving as a base station, and the like, and may include all or some of the functions of the BS, the ABS, the nodeB, the eNodeB, the BTS, the MMR-BS, the RS, the HR-RS, and the like.

FIG. 1 is a diagram showing a 5G network according to an exemplary embodiment of the present invention.

As shown in FIG. 1, a 5G network 1000 according to an exemplary embodiment of the present invention includes user equipment (UE) 100, an access network (AN) 200, an access and mobility management function (AMF) 310, a session management function (SMF) 320, a user plane function (UPF) 330, a data network (DN) 400, a policy control function (PCF) 500, and a unified data management (UDM) 600.

The UE 100 may access a network through the AN 200. The AN 200 includes a 3GPP access network 210 and a non-3GPP access network 220. The UE 100 may access a mobile radio access network via the 3GPP access network 210. The UE 100 may access a wireless LAN access network via the non-3GPP access network 220. The non-3GPP access network 220 includes a non-3GPP interworking function (N3IWF) 221 for the N3 and N2 interfaces with the UPF 330 and the AMF 310 by a 5G core network common interface principle.

The AMF 310 and the SMF 320 are network entities that process control signals. The AMF 310 performs authentication, connection, and mobility control functions. The SMF 320 has a session control function (establishment/modification/release for a session), and performs a signaling procedure for traffic path establishment and traffic mobility management. That is, the SMF 320 controls a data path between the UPF 330 and the AN 200. The AMF 310 has a non-access stratum (NAS) signal interface N1 together with the UE 100.

The UPF 330 is a network entity of a data plane that accommodates the multiple access networks 210 and 220 via common N3 interface. The UPF 330 connects a data plane between the multiple access networks 210 and 220 and the DN 400 so that traffic of the UE 100 (i.e., the user) can be transmitted and received.

The UPF 330 and the access network 200 receive control rules for traffic between the UE 100 and the UPF 330 via N4 and N2 interfaces from the SMF 320, respectively, and perform functions such as traffic detection, routing, and QoS control using the received control rules.

The PCF 500 is connected to the SMF 320 through an N7 signal interface, and controls policies related to session, mobility, and QoS. The PCF 500 may transmit policy and charging control rules (PCCs) required for the SMF 320 to map into (a) ATSSS rules to the SMF 320.

The UDM 600 is connected to the SMF 320 through an N10 signal interface, and manages user information management and policy for each UE such as subscription information of the UE 100. The UDM 600 may transmit information about the profile and subscription of the UE 100 to the SMF 320 for ATSSS function.

As described above, the 5G network system according to an exemplary embodiment of the present invention is an integrated structure that simultaneously accommodates the 3GPP access network 210 and the non-3GPP access network 220. In order to provide the ATSSS function in such an integrated structure, a procedure for establishing a multi-access PDU (MA PDU) session and a procedure for modifying the established MA PDU session to an SAPDU or releasing the established PDU session are required. Hereinafter, with reference to FIG. 2 and FIG. 3, a method for modifying to an SA PDU session or releasing an MA PDU session in a state where an MA PDU session is established will be described.

Figure 2:
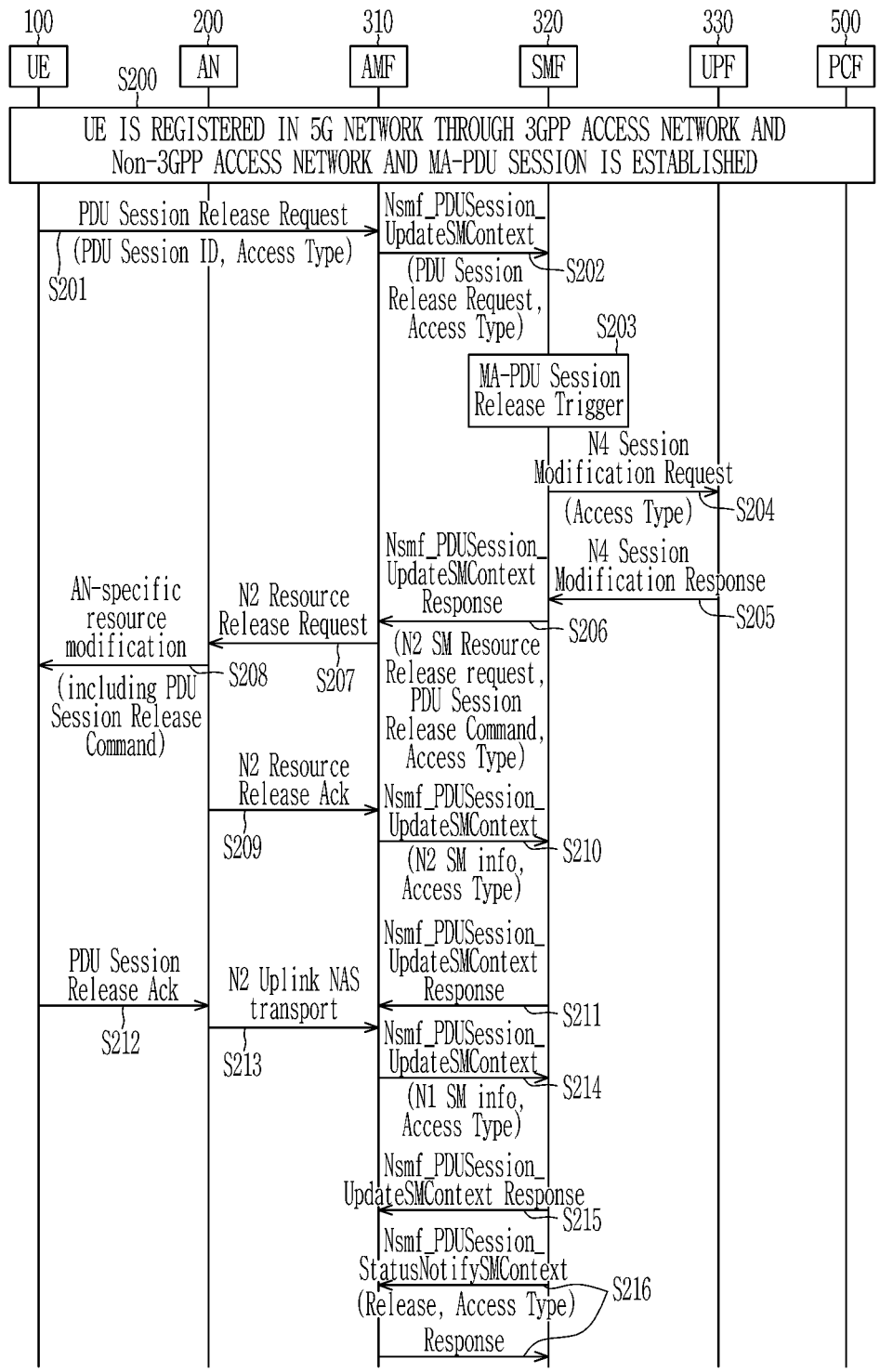
FIG. 2 is a flowchart showing an MA PDU session release method according to an exemplary embodiment of the present invention.

FIG. 2 is a flowchart showing an MA PDU session release method according to an exemplary embodiment of the present invention.

The MA PDU session release method of FIG. 2 relates to a method of modifying to an SA PDU session by releasing one access in an MA PDU session.

First, it is assumed in FIG. 2 that the UE 100 is already registered in the 5G network through the 3GPP access network 210 and the non-3GPP access network 220 and that an MA PDU session is created by MA PDU session establishment procedures (S200). The MA PDU session may have a unique (or the same) PDU session ID. In the state where the MA PDU session is established, the UE 100 decides to release one access of the MA PDU session for a predetermined reason. Further, a network other than the UE 100 may decide to release one access of the MA PDU session.

The UE 100 transmits a PDU session release request message to the AMF 310 via the access network 210 or 220 to be released in the MA PDU session (S201). In the following description, it is assumed that the access network to be released in the MA PDU session is the 3GPP access network 210 for convenience of explanation. Accordingly, in FIG. 2, a PDU session release request message may be transmitted through the 3GPP access network 210.

The PDU session release request message is an N1 NAS message, and includes a PDU session ID and an access type. Here, the access type indicates an access type to be released in the MA PDU session. That is, the access type indicates whether the MA PDU session release procedure will be applied to the 3GPP access network 210 or the non-3GPP access network 220. Accordingly, in FIG. 2, the access type can be indicated as '3GPP access network'. Although the PDU session release request is shown as being triggered by the UE 100 in FIG. 2, it may be triggered by the network (AMF, SMF, or PCF).

When receiving the PDU session request message in step S201, the AMF 310 transmits an Nsmf_PDUSession_UpdateSMContext message to the SMF 320 via the N11 interface (S202). The Nsmf_PDUSession_UpdateSMContext message includes the PDU session release request and the access type received in step S201.

The SMF 320 recognizes the access type to be released through the Nsmf_PDUSession_UpdateSMContext message received in step S202. At this time, the SMF 320 triggers the PDU session release for the access type to be released (S203).

The SMF 320 transmits an N4 session modification request message including the access type to the UPF 330 (S204) and receives an N4 session modification response message from the UPF 330 (S205). Here, the UPF 330 releases the tunnel and the access resource for the requested access type of the corresponding N4 session.

The SMF 320 transmits an Nsmf_PDUSession_UpdateSMContext response message to the AMF 310 via the N11 interface (S206). The Nsmf_PDUSession_UpdateSMContext response message includes an N2 SM resource release request, a PDU session release command, and the access type. Here, the N2 SM resource release request is to request release of the radio resource of the access type (i.e., 3GPP access network) to be released. The PDU session release command is a message to be transmitted to the UE 100 by the SMF 320, and is carried in an N1 SM container.

The AMF 310 transmits an N2 resource release request message to the access network indicated by the access type (i.e., the 3GPP access network 210) (S207). The 3GPP access network 210 receiving the N2 resource release request message in step S207 performs radio resource modification with the UE100 (S208). In step S208, a PDU Session release command message, which is an N1 NAS message requesting to release a PDU session, is transmitted to the UE 100. Then, the AMF 310 receives an N2 resource release Ack (acknowledge) from the 3GPP access network 210, which is a response to the N2 resource release request message (S209).

The AMF 310 transmits an Nsmf_PDUSession_UpdateSMContext message to the SMF 320 (S210). The Nsmf_PDUSession_UpdateSMContext message includes the N2 session management information (N2 SM info) and the access type. Here, the N2 SM information indicates an N2 resource release Ack and the location information of the user. The AMF 310 receives the Nsmf_PDUSession_UpdateSMContext response message from the SMF 320 as a response in step S210 (S211).

Meanwhile, the UE 100 transmits a PDU session release Ack to the 3GPP access network 210 (S212). Here, the step S212 is performed before the radio resource release is completely performed in the step S208. That is, steps S210 to S211 and steps S213 to S216 described below are independently performed.

The 3GPP access network 210 transmits the N1 NAS message (PDU session release Ack) received from the UE 100 in step S212 to the AMF 310 through an N2 uplink NAS transport message (S213).

The AMF 310 transmits an Nsmf_PDUSession_UpdateSMContext message to the SMF 320 (S214). Here, the Nsmf_PDUSession_UpdateSMContext message includes N1 session management information (N1 SM info) and the access type in which the radio resource is released. Here, the N1 SM information indicates a PDU session release Ack and the location information of the user.

The SMF 320 transmits an Nsmf_PDUSession_UpdateSMContext response message to the AMF 310 in response to step S214 (S215).

Then, the SMF 320 transmits an Nsmf_PDUSession_StatusNotifySMContext message including the released access type (for example, the 3GPP access network 210) to the AMF 310 to notify that one access of the MA PDU session is released, and receives a response from the AMF 310 (S216).

Figure 3:
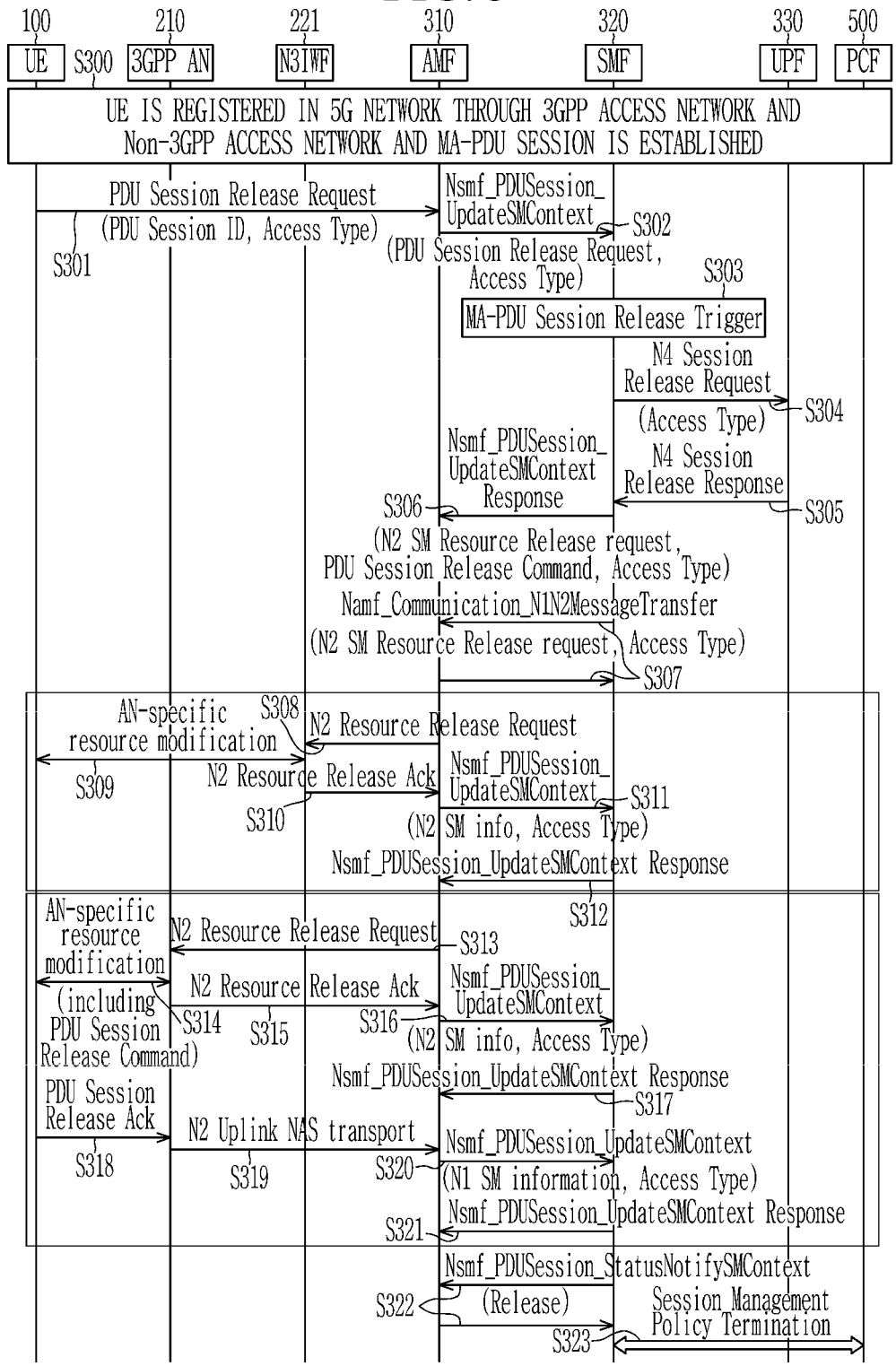
FIG. 3 is a flowchart showing an MA PDU session release method according to another exemplary embodiment of the present invention.

FIG. 3 is a flowchart showing an MA PDU session release method according to another exemplary embodiment of the present invention.

The MA PDU session release method of FIG. 3 relates to a method for releasing all accesses established in an MA PDU session.

First, it is assumed in FIG. 3 that the UE 100 is already registered in the 5G network via the 3GPP access network 210 and the non-3GPP access network 220 and that an MA PDU session is created by MA PDU session establishment procedures (S300). The MA PDU session may have a unique (or the same) PDU session ID. In the state where the MA PDU session is established, the UE 100 decides to release all of the MA PDU sessions for a predetermined reason. Further, a network other than the UE 100 may decide to release all of the MA PDU sessions.

The UE 100 transmits a PDU session release request message to the AMF 310 through one access network 210 or 220 (S301). In the following description, it is assumed that the PDU session release request message is transmitted through the 3GPP access network 210 for convenience of explanation.

The PDU session release request message is an N1 NAS message, and includes a PDU session ID and an access type. Here, the access type indicates an access type to be released in the MA PDU session. That is, the access type is set to both accesses (i.e., 3GPP access network 210 and non-3GPP access network 220) since the case of FIG. 3 releases all of the MA PDU sessions. Although the PDU session release request is shown as being triggered by the UE 100 in FIG. 2, it may be triggered by the network (AMF, SMF, or PCF).

When receiving the PDU session request message in step S301, the AMF 310 transmits an Nsmf_PDUSession_UpdateSMContext message to the SMF 320 via the N11 interface (S302). The Nsmf_PDUSession_UpdateSMContext message includes the PDU session release request (i.e., N1 SM container) and the access type received in step S301.

The SMF 320 recognizes the access type to be released through the Nsmf_PDUSession_UpdateSMContext message received in step S302. At this time, the SMF 320 recognizes that it is a release request for multiple access (i.e., both accesses) through the access type, and triggers PDU session release for multiple accesses (S303).

The SMF 320 transmits an N4 session release request message including the access type to the UPF 330 (S304), and receives an N4 session release response message from the UPF 330 (S305). Here, the UPF 330 releases the tunnel and all resources associated with the corresponding N4 session.

The SMF 320 performs steps S306 and S307 described below for each access network 200.

First, the SMF 320 transmits an Nsmf_PDUSession_UpdateSMContext response message to the AMF 310 for the access network (i.e., the 3GPP access network 210) that transmitted the PDU session release request message in step S301 (S306). The Nsmf_PDUSession_UpdateSMContext response message includes an N2 SM resource release request, a PDU session release command, and the access type. Here, the N2 SM resource release request is to request release of the radio resource of the access type to be released. The PDU session release command is a message to be transmitted to the UE 100 from the SMF 320, and is carried in the N1 SM container.

The SMF 320 transmits a Namf_Communication_N1N2MessageTransfer message to the AMF 310 via the N11 interface for an access network (e.g., a non-3GPP access network 220) that has not transmitted a PDU session release request message in step S301 (S307). Here, the Namf_Communication_N1N2MessageTransfer message includes an N2 SM (Session Management) resource release request, and the access type. The N2 SM resource release is to request release of the radio resource of the access type to be released.

Steps S308 to S312 to be described below are performed following step S307, and steps S313 to S323 are performed following step S306. Further, steps S308-S312 and steps S313-S323 are performed independently of each other.

Steps S308-S312 represent a procedure in which the AMF 310 having received the message in step S307 performs an N2 resource release procedure for the access network (i.e., the non-3GPP access network 220) that has not transmitted the PDU session release request message in step S301.

The AMF 310 transmits an N2 resource release request message to the N3IWF 221 included in the non-3GPP access network 220 (S308). The N3IWF 221 then performs resource modification with the UE 100 (S309). In step S309, a PDU session release command message, which is an N1 NAS message requesting the release of MA PDU session, is not transmitted to the UE 100. Then, the AMF 310 receives an N2 resource release Ack (acknowledge) from the N3IWF 221, which is a response to the N2 resource release request message (S310).

The AMF 310 transmits an Nsmf_PDUSession_UpdateSMContext message to the SMF 320 (S311). The Nsmf_PDUSession_UpdateSMContext message includes the N2 session management information (N2 SM info) and the access type. Here, the N2 SM information indicates an N2 resource release Ack and the location information of the user. The AMF 310 receives the Nsmf_PDUSession_UpdateSMContext response message from the SMF 320 as a response in step S311 (S312).

Steps S313-S318 represent a procedure in which the AMF 310 having received the message in step S306 performs an MA PDU session release procedure for the access network (i.e., the 3GPP access network 210) that has transmitted the PDU session release request message in step S301.

The AMF 310 transmits an N2 resource release request message to the 3GPP access network 210 (S313) The 3GPP access network 210 receiving the N2 resource release request message in step S313 performs resource modification with the UE 100 (S314). In step S314, a PDU session release command message is transmitted to the UE 100, which is an N1 NAS message requesting the release of the MA PDU session. Then, the AMF 310 receives an N2 resource release Ack from the 3GPP access network 210, which is a response to the N2 resource release request message (S315).

The AMF 310 transmits an Nsmf_PDUSession_UpdateSMContext message to the SMF 320 (S316) The Nsmf_PDUSession_UpdateSMContext message includes the N2 SM information (N2 SM info) and the access type. Here, the N2 SM information indicates an N2 resource release Ack and the location information of the user. The AMF 310 receives the Nsmf_PDUSession_UpdateSMContext response message from the SMF 320 as a response in step S316 (S317).

Meanwhile, the UE 100 transmits a PDU session release Ack to the 3GPP access network 210 (S318). Here, the step S318 is performed before the radio resource release is completely performed in the step S314. That is, steps S316 to S317 and steps S319 to S323 described below are independently performed.

The 3GPP access network 210 transmits the N1 NAS message (PDU session release Ack) received from the UE 100 in step S318 to the AMF 310 through an N2 uplink NAS transport message (S319).

The AMF 310 transmits an Nsmf_PDUSession_UpdateSMContext message to the SMF 320 (S320). Here, the Nsmf_PDUSession_UpdateSMContext message includes N1 session management information (N1 SM info) and the access type in which radio resource is released. The N1 SM information indicates a PDU session release Ack and the location information of the user.

The SMF 320 transmits an Nsmf_PDUSession_UpdateSMContext response message to the AMF 310 in response to step S320 (S321). Then, the SMF 320 transmits an Nsmf_PDUSession_StatusNotifySMContext message, which includes information (Release) indicating that the release of the MA PDU session is completed, to the AMF 310, and receives a response from the AMF 310 (S322).

Step S323 is a step of deleting a dynamic PCC (policy and charging control rule) through the PCF 500 when the dynamic PCC is applied to the MA PDU session.

Meanwhile, referring to steps S309 and S314 of FIG. 3, a PDU session release command message is not transmitted to the UE 100 in step S309, and a PDU session release command message is transmitted to the UE 100 in step S314. That is, the N1 NAS message for commanding the release of the MA PDU session is transmitted from the network to the UE 100 through only one access. Accordingly, the method of FIG. 3 can perform the MA PDU session release function while minimizing the signaling resources.

Although the 3GPP access network 210 has been described as an example of an access network used by the UE 100 to transmit an N1 NAS signal for releasing the MA PDU session to the network in the description of FIGS. 2 and 3, those can be applied to the non-3GPP access network 220 as well.

Figure 4:
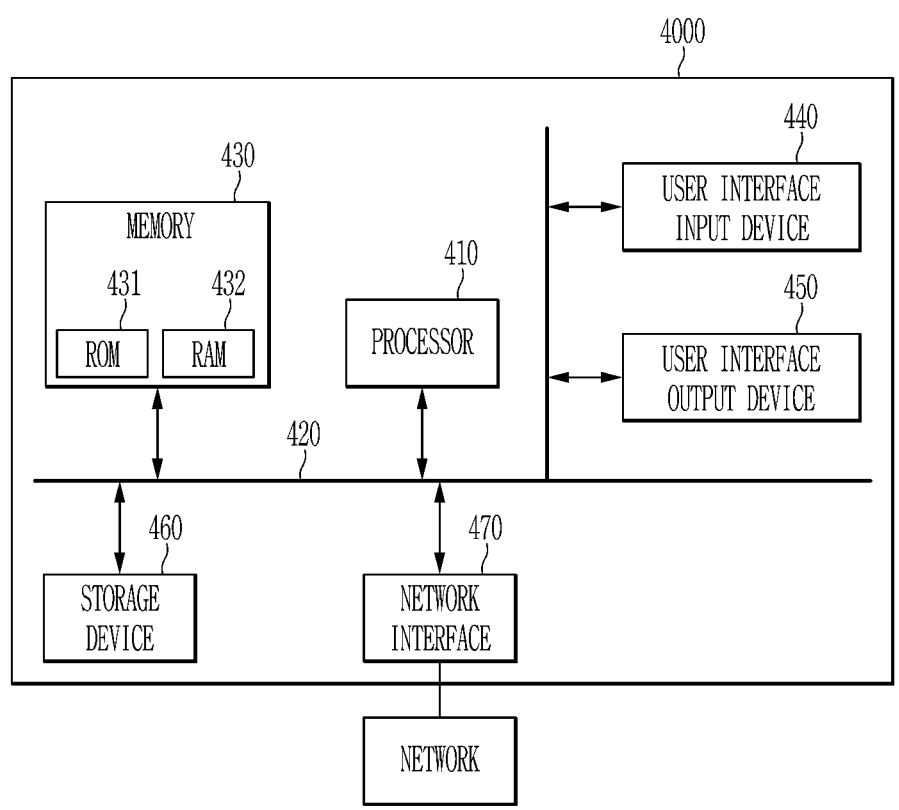
FIG. 4 is a diagram showing a computing system according to an exemplary embodiment of the present invention.

FIG. 4 is a diagram showing a computing system according to an exemplary embodiment of the present invention.

The computer system 4000 of FIG. 4 may be the AMF 310, the SMF 320, the UPF 330, the DN 400, the PCF 500, or the UDM 600 of FIG. 1. The UE 100, the access network 200, the AMF 310, the SMF 320, the UPF 330, the DN 400, the PCF 500, or the UDM 600 may be implemented as a computer system, for example, a computer readable medium.

The computer system 4000 includes at least one of a processor 410, a memory 430, a user interface input device 440, a user interface output device 450, and a storage device 460, that communicate via a bus 420. The computer system 4000 may also include a network interface 470 coupled to a network. The network interface 470 may transmit or receive signals with other entities over the network.

The processor 410 may be a central processing (CPU) or a semiconductor device that executes instructions stored in the memory 430 or the storage device 460. The processor 410 may be configured to implement the functions and methods described in FIG. 1 to FIG. 3.

The memory 430 and the storage device 460 may include various forms of volatile or non-volatile storage media. For example, the memory 430 may include a read only memory (ROM) 431 and a random access memory (RAM) 432. In an exemplary embodiment of the present invention, the memory 430 may be located inside or outside the processor 410, and the memory 430 may be coupled to the processor 410 through various already-known means.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for releasing a packet data unit (PDU) session performed by a session management function (SMF) in a network, the method comprising:
   deciding a single access network, which is an access network to be released in a multi-access packet data unit (MA PDU) session which is already established;
   transmitting a first message including first information corresponding to an access type of the decided single access network to a user plane function (UPF);
   receiving a response message corresponding to the first message from the UPF; and
   transmitting a second message including second information and a PDU session release command message to an access and mobility management function (AMF), wherein the second information indicates the access type of the decided single access network.

2. The method of claim 1, further comprising:
   receiving a third message including third information, which indicates an access type of a single access network to be released in the MA PDU session, from the AMF.

3. The method of claim 2, wherein
   the deciding includes deciding the single access network based on the third information the access type is a 3GPP access network, a non 3GPP access network, or both the 3GPP access network and the non 3GPP access network.

4. The method of claim 1, wherein
   the PDU session release command message is transferred to a user equipment through the decided single access network.

5. The method of claim 1, wherein
   the single access network is a 3GPP access network or a non-3GPP access network.

6. The method of claim 1, wherein
   the first message is an N4 session Modification Request message.

7. The method of claim 2, wherein:
   the third message is an Nsmf_PDUSession_UpdateSMContext request message, and the second message is an Nsmf_PDUSession_UpdateSMContext response message.

8. A method for releasing a packet data unit (PDU) session performed by an access and mobility management function (AMF) in a network, the method comprising:
   receiving a first message including first information and a PDU session release command message from a session management function (SMF), wherein the first information indicates an access type of a first access network; and
   receiving a second message including second information from the SMF, wherein the second information indicates an access type of a second access network, wherein the PDU session release command message is transferred to a user equipment only through the first access network between the first access network and the second access network.

9. The method of claim 8, wherein
   the first message is an Nsmf_PDUSession_UpdateSMContext response message or Namf_Communication_N1N2MessageTransfer message, and the second message is an Nsmf_PDUSession_UpdateSM-Context response message or Namf_Communication_N1N2MessageTransfer message.

10. The method of claim 8, wherein
the first access network is a 3GPP access network or a non-3GPP access network, and
the second access network is the 3GPP access network or the non-3GPP access network.

\* \* \* \* \*